(12) United States Patent
Mabuchi (10) Patent No.: US 8,209,965 B2
(45) Date of Patent: Jul. 3, 2012

(54) ADDITIVE-AGENT DIFFUSION PLATE STRUCTURE IN EXHAUST PASSAGE, AND ADDITIVE-AGENT DIFFUSION PLATE IN EXHAUST PASSAGE

(75) Inventor: Tomoki Mabuchi, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 581 days.

(21) Appl. No.: 12/209,548

(22) Filed: Sep. 12, 2008

(65) Prior Publication Data

US 2009/0071133 A1 Mar. 19, 2009

(30) Foreign Application Priority Data

Sep. 14, 2007 (JP) ................. 2007-240013

(51) Int. Cl.
*F01N 3/24* (2006.01)
(52) U.S. Cl. ............... 60/295; 60/301; 60/317
(58) Field of Classification Search .......... 60/286, 60/295, 301, 317
See application file for complete search history.

(56) References Cited

U.S. PATENT DOCUMENTS

| | | | | |
|---|---|---|---|---|
| 6,074,619 A * | 6/2000 | Schoubye | ........... | 423/239.1 |
| 6,516,610 B2 * | 2/2003 | Hodgson | ........... | 60/286 |
| 2007/0036694 A1 * | 2/2007 | Nishioka et al. | ........... | 422/168 |
| 2007/0204751 A1 * | 9/2007 | Wirth et al. | ........... | 96/290 |

FOREIGN PATENT DOCUMENTS

| | | |
|---|---|---|
| JP | 3-68516 U | 7/1991 |
| JP | 10-165769 A | 6/1998 |
| JP | 2001-516635 A | 10/2001 |
| JP | 2003-10644 A | 1/2003 |
| JP | 2005-113688 A | 4/2005 |
| JP | 2006-207395 A | 8/2006 |
| JP | 2007-32472 A | 2/2007 |

* cited by examiner

*Primary Examiner* — Thomas Denion
*Assistant Examiner* — Jonathan Matthias
(74) *Attorney, Agent, or Firm* — Sughrue Mion, PLLC (57) ABSTRACT

An additive-agent diffusion plate structure in an exhaust passage for an engine includes: an injection port that injects an additive agent, and that is disposed so that the injected additive agent crosses the exhaust passage; and an additive-agent diffusion plate that diffuses the additive agent injected from the injection port into the exhaust passage, at a position upstream of an exhaust gas purification device disposed in the exhaust passage. The additive-agent diffusion plate includes: a bottom wall that is disposed to extend in an exhaust-gas flow direction in which exhaust gas flows; a collision portion with which the additive agent injected into the exhaust passage collides; and a passage portion that is open behind the collision portion, when the additive-agent diffusion plate is seen from a position of the injection port.

14 Claims, 9 Drawing Sheets

ADDITIVE-AGENT DIFFUSION PLATE STRUCTURE IN EXHAUST PASSAGE, AND ADDITIVE-AGENT DIFFUSION PLATE IN EXHAUST PASSAGE

The disclosure of Japanese Patent Application No. 2007-0240013 filed on Sep. 14, 2007 including the specification, drawings and abstract is incorporated herein by reference in its entirety.

BACKGROUND OF THE INVENTION

1. Field of the Invention

The invention relates to an additive-agent diffusion plate structure and an additive-agent diffusion plate that diffuse an additive agent injected into an exhaust passage for an engine, at a position upstream of an exhaust gas purification device disposed in the exhaust passage.

2. Description of the Related Art

Exhaust gas discharged from an engine, particularly, a diesel engine, generally contains pollutants generated, by combustion, for example, nitrogen oxides (hereinafter, referred to as NOx) such as nitrogen monoxide. To prevent air pollution, it is strongly required to reduce the amount of such pollutants discharged from the diesel engine. NOx may be discharged, together with exhaust gas, from a direct injection gasoline engine in which gasoline is injected directly into a combustion chamber, depending on an operating condition. Therefore, it is also required to reduce the amount of the pollutants discharged from the direct injection gasoline engine.

Thus, an exhaust gas purification device that includes a three-way catalyst is provided in an exhaust passage, to purify NOx discharged together with the exhaust gas.

However, the exhaust gas purification device including the three-way catalyst may not sufficiently purify NOx, depending on the type of the engine. For example, when employing a lean-burn diesel engine, the exhaust gas contains excessive oxygen, and therefore, a fuel component (HC) easily reacts with the oxygen (i.e., the fuel component (HC) is easily combusted). Thus, it is difficult for the three-way catalyst to sufficiently purify NOx.

Accordingly, for example, Japanese Utility Model Application Publication No. 3-68516 describes a technology in which an exhaust gas purification device including a zeolitic catalyst is provided in an exhaust passage, and a fuel component (HC component) is supplied to exhaust gas, at a position upstream of the exhaust gas purification device, to efficiently purify NOx.

Also, for example, Japanese Patent Application Publication No. 2005-113688 (JP-A-2005-113688) describes a technology in which an exhaust gas purification device including a selective reduction NOx catalyst is provided in an exhaust passage, and urea is supplied to exhaust gas, at a position upstream of the exhaust gas purification device, to efficiently purify NOx in the exhaust gas.

The additive agent, such as the fuel component or the urea, needs to be efficiently diffused in the exhaust gas, to increase NOx purification performance of the exhaust gas purification device.

Thus, for example, Japanese Patent Application Publication No. 10-165769 (JP-A-10-165769) describes a technology in which a rectifying lattice, which includes a gas mixing promoter that promotes mixing of exhaust gas and an additive agent (a fuel component or a urea aqueous solution), is provided in an exhaust passage, at a position between a position from which the additive agent is supplied, and an exhaust gas purification device. The rectifying lattice stands in a direction substantially perpendicular to a direction in which the exhaust gas flows (hereinafter, referred to as "exhaust-gas flow direction"), and occupies an entire cross section of the exhaust passage. Thus, the rectifying lattice efficiently diffuses the additive agent in the exhaust gas.

Also, for example, Japanese Patent Application Publication No. 2007-32472 (JP-A-2007-32472) describes a technology in which an additive agent is supplied from an upper position (supply position) on a peripheral wall portion of an exhaust passage; and a plurality of plates are disposed at a plurality of levels from an upper level to a lower level, below the supply position. The additive agent supplied into the exhaust passage sequentially collides with the plates from the upper level so that the additive agent is diffused in the exhaust gas. In this case, the plurality of the plates include upper porous plates and a lowermost flat, plate. The additive agent supplied into the exhaust passage collides with the upper porous plates at portions other than hole portions. The lowermost flat plate receives the additive agent that has passed through the hole portions of the upper porous plates. This prevents adherence of the additive agent to a wall surface of the exhaust passage.

The above-described additive-agent diffusion plate including the rectifying lattice is disposed in the exhaust passage to stand in the direction substantially perpendicular to the exhaust-gas flow direction, and to occupy an entire cross section of the exhaust passage. That is, the additive-agent diffusion plate is disposed to extend in the direction orthogonal to the exhaust-gas flow direction. In addition, the gas mixing promoter of the additive-agent diffusion plate includes a gas swirl generator that protrudes to face the flow of the exhaust gas, and a gas agitator that is bent in an inverted V-shape to face the flow of the exhaust gas. Therefore, a flow passage area of the exhaust passage, through which the exhaust gas flows (i.e., a sectional area of the exhaust passage) is greatly decreased by the gas mixing promoter (the gas swirl generator and the gas agitator). This results in a significant increase in a back pressure downstream of the additive-agent diffusion plate in the exhaust-gas flow direction.

Further, the additive-agent diffusion plate including the rectifying lattice is formed by combining partition plates in a vertical direction and a horizontal direction. In addition, the gas mixing promoter includes the gas swirl generator that protrudes from the partition plate, and the gas agitator disposed on the partition plate to be bent in an inverted V-shape. Therefore, the additive-agent diffusion plate has an extremely complicated structure.

In the above-described additive-agent diffusion plate including the plurality of plates, although the plates are disposed at the plurality of levels, an injection range, to which the additive agent is injected, has an extremely large diameter near the lowermost flat plate, because the additive agent is injected in a conical shape whose apex is the supply position (injection port). Therefore, the additive agent that has passed through the hole portions of the porous plates may not collide with the lowermost flat plate. As a result, the performance of diffusing the additive agent may not be increased.

Further, in the additive-agent diffusion plate including the plurality of plates, the flow passage area of the exhaust passage, through which the exhaust gas flows, may be decreased by the plates, because the plurality of plates need to be provided at the plurality of levels. This makes it difficult to suppress the increase in the back pressure downstream of the additive-agent diffusion plate in the exhaust-gas flow direction.

SUMMARY OF THE INVENTION

The invention provides an additive-agent diffusion plate structure and an additive-agent diffusion plate in an exhaust passage, which have a simple configuration, with which an additive agent reliably collides so that performance of diffusing the additive agent in exhaust gas is increased, and which suppress an increase in a back pressure downstream of the additive-agent diffusion plate in an exhaust-gas flow direction.

A first aspect of the invention relates to an additive-agent diffusion plate structure in an exhaust passage for an engine that includes: an injection port that injects an additive agent, and that is disposed so that the injected additive agent crosses the exhaust passage, and an additive-agent diffusion plate that diffuses the additive agent injected from the injection port into the exhaust passage, at a position upstream of an exhaust gas purification device disposed in the exhaust passage. The additive-agent diffusion plate includes: a bottom wall that is disposed to extend in an exhaust-gas flow direction in which exhaust gas flows; a collision portion with which the additive agent injected into the exhaust passage collides; and a passage portion that is open behind the collision portion, when the additive-agent diffusion plate is seen from a position of the injection port.

According to the first aspect of the invention, the additive-agent diffusion plate is disposed to extend in the exhaust-gas flow direction. Therefore, a flow passage area of the exhaust passage, through which the exhaust gas flows (i.e., a sectional area of the exhaust passage) is not greatly decreased by the additive-agent diffusion plate. Accordingly, it is possible to sufficiently suppress an increase in a back pressure downstream of the additive-agent diffusion plate in the exhaust-gas flow direction. Further, because the additive-agent diffusion plate is disposed to extend in the exhaust-gas flow direction, the additive-agent diffusion plate has an extremely simple configuration. As a result, it is possible to provide the additive-agent diffusion plate at extremely low cost.

The additive agent is injected from the injection port to cross the exhaust passage, and collides with the additive-agent diffusion plate, that is, the collision portion. Therefore, the additive agent is reliably atomized using energy generated due to collision between the additive agent and the additive-agent diffusion plate, that is, between the additive agent and the collision portion. Part of the additive agent that has collided with the collision portion is guided to the area on the side of the rear surface of the additive-agent diffusion plate, through the passage portion. Because the passage portion is open behind the collision portion when the additive-agent diffusion plate is seen from the position of the injection port, it is possible to avoid the situation where the additive agent injected into the exhaust gas passes straight through the passage portion toward the area on the side of the rear surface of the additive-agent diffusion plate, without colliding with the collision portion. Accordingly, the additive agent is smoothly atomized using the energy generated due to the collision between the additive agent and the additive-agent diffusion plate, that is, between the additive agent and the collision portion. Thus, it is possible to efficiently diffuse the additive agent in the exhaust gas in the area on the side of the surface of the additive-agent diffusion plate, and to diffuse the additive agent in the exhaust gas in the area on the side of the rear surface of the additive-agent diffusion plate via the passage portion.

The collision portion may be raised from the bottom wall to face the injected additive agent.

With the configuration, the additive agent injected from the injection port collides with the collision portion that is raised from the bottom wall to face the injected additive agent. Therefore, great energy is applied to the additive agent due to the collision between the additive agent and the collision portion of the additive-agent diffusion plate. Accordingly, the additive agent is atomized into finer particles using the great collision energy. Thus, it is possible to more efficiently diffuse the additive agent in the exhaust gas.

An injection range, to which the additive agent is injected from the injection port, may shift in the exhaust-gas flow direction, according to a flow speed of the exhaust gas; and the additive-agent diffusion plate may be disposed to extend over an entire area of the injection range that shifts according to the flow speed of the exhaust gas.

With the configuration, the additive-agent diffusion plate is positioned to extend over both of an upstream injection range and a downstream injection range. When the flow speed of the exhaust gas is low, the additive agent is injected to the upstream injection range positioned upstream of the downstream injection range to which the additive agent is injected when the flow speed of the exhaust gas is high. In other words, when the flow speed of the exhaust gas is high, the additive agent is injected to the downstream injection range positioned downstream of the upstream injection range to which the additive agent is injected when the flow speed of the exhaust gas is low. Accordingly, the additive agent injected from the injection port reliably collides with the additive-agent diffusion plate so that the additive agent is atomized, regardless of the flow speed of the exhaust gas. Thus, it is possible to reliably diffuse the additive agent in the exhaust gas.

The additive-agent diffusion plate may include a reservoir portion that retains part of the additive agent injected from the injection port; and the reservoir portion may be defined in the exhaust gas flow direction by raised portions that are raised from the bottom wall to face a flow of the exhaust gas at positions upstream and downstream of the reservoir portion in the exhaust-gas flow direction.

With the configuration, when the flow of the exhaust gas enters the reservoir portion, the flow speed of the exhaust gas is decreased by the raised portions at positions upstream and downstream of the reservoir portion. Accordingly, the additive agent retained in the reservoir portion is evaporated and slowly drawn out from the reservoir portion due to the exhaust gas whose flow speed is decreased. Thus, the additive agent is efficiently diffused in the exhaust gas.

The collision portion may include a surface that extends in a direction substantially orthogonal to an injection axis along which the additive agent is injected.

With the configuration, the additive agent injected from the injection port collides with the collision portion that includes a surface that extends in the direction substantially orthogonal to the injection axis along which the additive agent is injected from the injection port. Therefore, the greatest energy is applied to the additive agent due to the collision between the additive agent and the collision portion of the additive-agent diffusion plate. Accordingly, the additive agent is atomized to finer particles using the great collision energy. Thus, it is possible to more efficiently diffuse the additive agent in the exhaust gas.

The injection port may be, provided on a peripheral wall portion of the exhaust passage at a side position, and the additive-agent diffusion plate may be inclined toward the injection port with respect to a horizontal surface.

With the configuration, the additive agent, which is injected from the injection port disposed on the peripheral wall portion of the exhaust passage at the side position, collides with a large area, of the additive-agent diffusion plate that is inclined toward the injection port with respect to a horizontal surface. Accordingly, the additive agent is atomized using the energy generated due to the collision. Thus, it is possible to efficiently diffuse the additive agent in the exhaust gas.

Further, because the injection port is provided on the peripheral wall portion of the exhaust passage at the side position, heat from the exhaust passage is unlikely to be retained near the injection port. Therefore, a supply pipe for supplying the additive agent to the injection port does not need to be protected with a heat-resistant material such as an insulator, unlike the case where, for example, the injection port is provided on the peripheral wall portion of the exhaust passage at the upper position, and the supply pipe needs to be protected with a heat-resistant material due to the heat retained in ah upper area of the exhaust passage. Thus, a heat-resistant material is not required, and therefore, the cost is reduced.

A second aspect of the invention relates to an additive-agent diffusion plate in an exhaust passage for an engine that includes: a bottom wall disposed to extend in an exhaust-gas flow direction in which exhaust gas flows in the exhaust passage; a collision portion with which an additive agent injected into the exhaust passage to cross the exhaust passage collides; and a passage portion that is open in the bottom wall at a position behind the collision portion when the additive-agent diffusion plate is seen from a position from which the additive agent is injected.

Thus, because the additive-agent diffusion plate is disposed to extend in the exhaust-gas flow direction, it is possible to reduce a decrease in the flow passage area of the exhaust passage, through which the exhaust gas flows, due to the additive-agent diffusion plate. Thus, it is possible to sufficiently suppress an increase in the back pressure downstream of the additive-agent diffusion plate in the exhaust-gas flow direction. In addition, it is possible to make the configuration of the additive-agent diffusion plate extremely simple, and accordingly, to provide the additive-agent diffusion plate at extremely low cost. Further, the additive agent injected from the injection port to cross the exhaust passage collides with the additive-agent diffusion plate, that is, the collision portion. The additive agent is atomized using the energy generated due to the collision between the additive agent and the additive-agent diffusion plate, that is, between the additive agent and the collision portion. Part of the additive agent that has collided with the collision portion is guided to the area on the side of the rear surface of the additive-agent diffusion plate, through the passage portion behind the collision portion. That is, it is possible avoid the situation where the additive agent passes straight through the passage portion without colliding with the collision portion. Accordingly, it is possible to efficiently diffuse the additive agent in the exhaust gas in the area on the side of the surface of the additive-agent diffusion plate, and to diffuse the additive agent in the exhaust gas in the area on the side of the rear surface of the additive-agent diffusion plate via the passage portion. Thus, it is possible to increase the performance of diffusing the additive agent.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the drawings.

Figure 1:
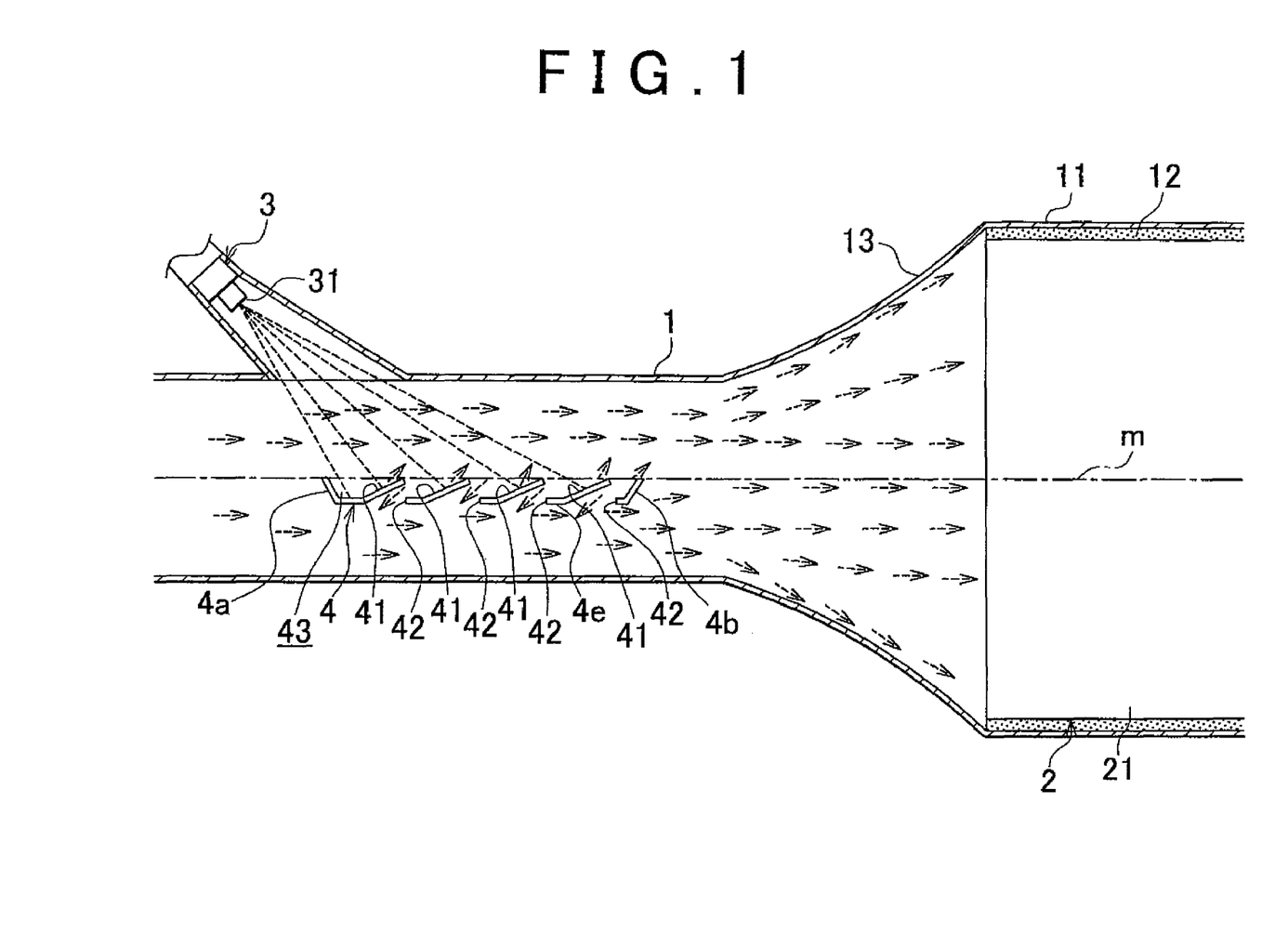
FIG. 1 is a sectional view of an area of an exhaust passage, where a diffusion plate according to a first embodiment of the invention is provided, the sectional view seen from the side.

FIG. 1 is ah exhaust passage for a diesel engine for a vehicle (an example of the engine), in which an additive-agent diffusion plate structure according, to a first embodiment of the invention is used. In FIG. 1, an exhaust gas purification device 2 is provided in an exhaust passage 1. The exhaust gas purification device 2 includes a selective reduction catalyst 21 that selectively causes nitrogen oxides (NOx) in exhaust gas to react with a reducing agent (an example of the additive agent) even in the presence of oxygen. The selective reduction catalyst 21 is provided inside a mat 12, in a large-diameter portion 11 of the exhaust passage 1, which has a large diameter. The large-diameter portion 11 is connected to another portion of the exhaust passage 1 by a warp portion 13 with a horn shape, which is warped toward an inside in a radial direction of the exhaust passage 1 from a downstream side toward an upstream side in a direction in which exhaust gas flows (hereinafter, referred to as "exhaust-gas flow direction"). In this case, the exhaust gas flowing in the exhaust passage 1 is guided along the warp portion 13 toward an outside in the radial direction of the exhaust passage 1, at an upstream portion of the warp portion 13 in the exhaust-gas flow direction. The flow of the exhaust gas is separated from the warp portion 13 at a downstream portion of the warp portion 13 in the exhaust-gas flow direction. Thus, the flow of the exhaust gas toward the mat 12 (toward an outside in a radial direction of the large-diameter portion 11) is effectively deflected by the warp portion 13. The exhaust-gas flow direction may be substantially parallel to a direction in which the exhaust passage 1 extends.

The selective reduction catalyst 21 reduces and purifies NOx in the exhaust gas flowing in the exhaust passage 1 using a reducing agent. In the selective reduction catalyst 21, for example, a zeolitic active ingredient is carried by a monolith catalyst carrier with a honeycomb-shaped cross section, which is made of cordierite ceramic or Fe—Cr—Al-based heat-resistant steel. When the active ingredient carried by the catalyst carrier receives the reducing agent, the active ingredient is activated to effectively transforms NOx to harmless substances. In this case, a method of reducing NOx using the selective reduction catalyst 21 is referred to as Selective Catalytic Reduction (SCR). Particularly, the SCR using urea as the reducing agent is referred to as Urea SCR.

An injection nozzle 3 is disposed upstream of the exhaust gas purification device 2 (the selective reduction catalyst 21) in the exhaust-gas flow direction. The injection nozzle 3 injects a urea aqueous solution (an example of the additive agent), which serves as the reducing agent. The injection nozzle 3 is provided on a peripheral wall of the exhaust passage 1 at an upper position. The urea aqueous solution is supplied from an injection port 31 of the injection nozzle 3 to an area upstream of the selective reduction catalyst 21 in the exhaust-gas flow direction. The urea aqueous solution and compressed air are supplied to the injection nozzle 3. The urea aqueous solution is atomized and injected from the injection port 31. The injection port 31 of the injection nozzle 3 is obliquely directed from the upper position on the peripheral wall portion of the exhaust passage 1 toward a downstream side in the exhaust-gas flow direction. That is, the injection port 31 of the injection nozzle 3 is obliquely inclined toward the downstream side in the exhaust-gas flow direction at an appropriate angle (for example, substantially 45 degrees) with respect to an axis m of the exhaust passage 1. In this case, the urea aqueous solution is stored in a storage tank. The urea aqueous solution is supplied to the injection nozzle 3 via a supply pipe made of synthetic resin. In FIG. 1, dashed arrows indicate the flow of the exhaust gas when the atomized urea aqueous solution is diffused in the exhaust gas, and solid arrows indicate the flow of the exhaust gas before the urea aqueous solution is diffused.

The urea aqueous solution injected from the injection port 31 of the injection nozzle 3 is hydrolyzed due to heat of the exhaust gas in the exhaust passage 1, and thus, ammonia is easily generated. The generated ammonia reacts with NOx contained in the exhaust gas in the selective reduction catalyst 21, and thus, the ammonia is transformed to water and harmless gas. The urea aqueous solution is an aqueous solution produced by dissolving solid urea or urea powder in water. The urea aqueous solution is stored in the storage tank, and supplied to the injection nozzle 3 via the supply pipe. In addition to the urea aqueous solution, an ammonia aqueous solution and a hydrocarbon aqueous solution may be used as the reducing agent (an example of the additive agent) injected from the injection nozzle 3.

Figure 2:
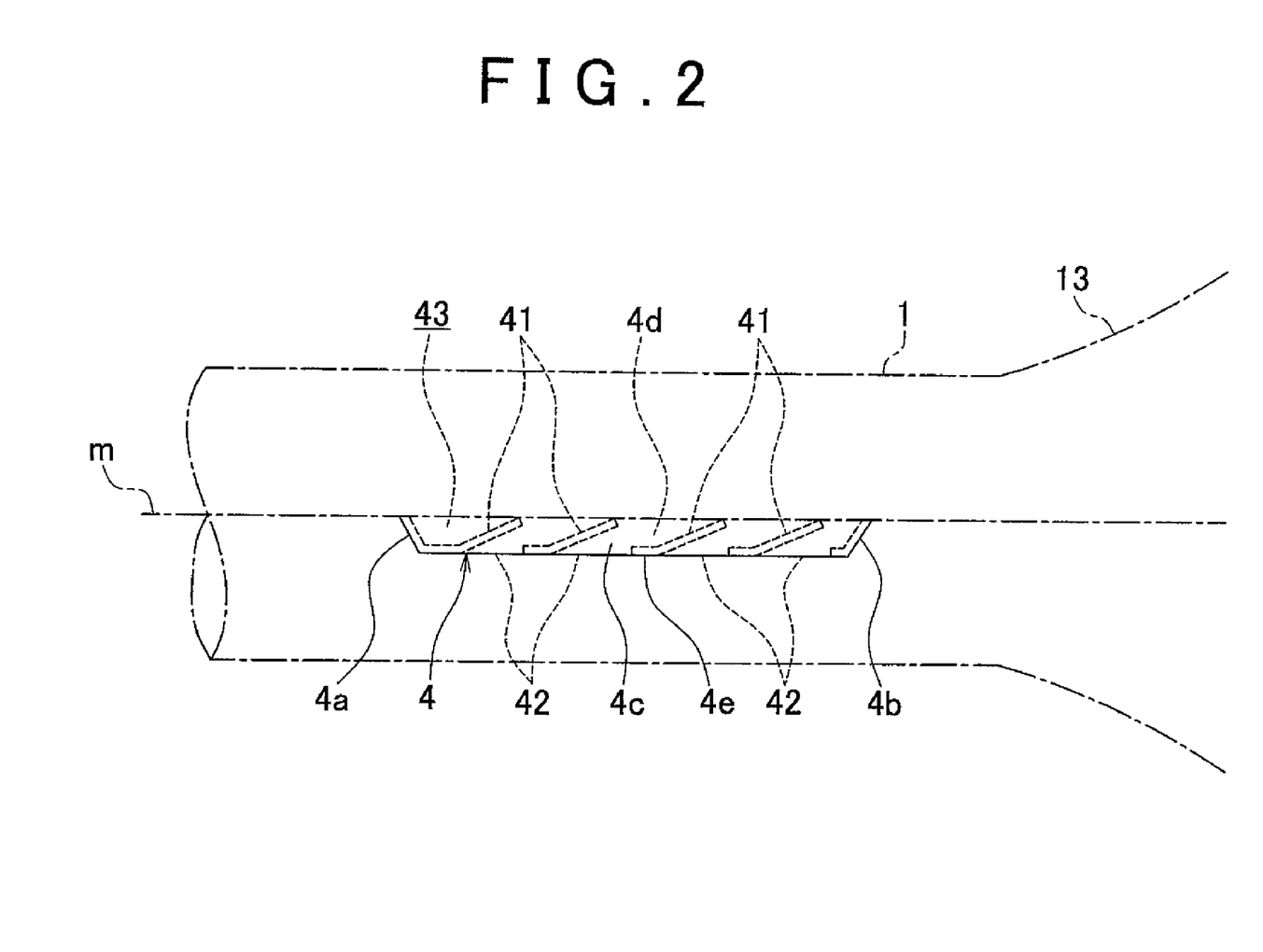
FIG. 2 is a side view of the diffusion plate seen from the side.

A diffusion plate 4 is provided directly downstream of the injection nozzle 3 in the exhaust-gas flow direction (i.e., upstream of the selective reduction catalyst 21 in the exhaust-gas flow direction). The diffusion plate 4 functions as the additive-agent diffusion plate, and diffuses the urea aqueous solution, which is injected from the injection nozzle 3 into the exhaust passage 1, in the exhaust gas. As shown in FIG. 1 and FIG. 2, the diffusion plate 4 is provided near a center portion of the exhaust passage 1 in a substantially horizontal state to extend in the exhaust-gas flow direction. The diffusion plate 4 includes an upstream end wall 4a, a downstream end wall 4b, a left end wall 4c, and a right end wall 4d. The upstream end wall 4a is formed by raising upward an upstream end of a bottom wall 4e. The downstream end wall 4b is formed by raising upward a downstream end of the bottom wall 4e. The left end wall 4c is formed by raising, upward a left end of the bottom wall 4e. The right end wall 4d is formed by raising upward a right end of the bottom wall 4e. Thus, the diffusion plate 4 has a tray shape.

Figure 3:
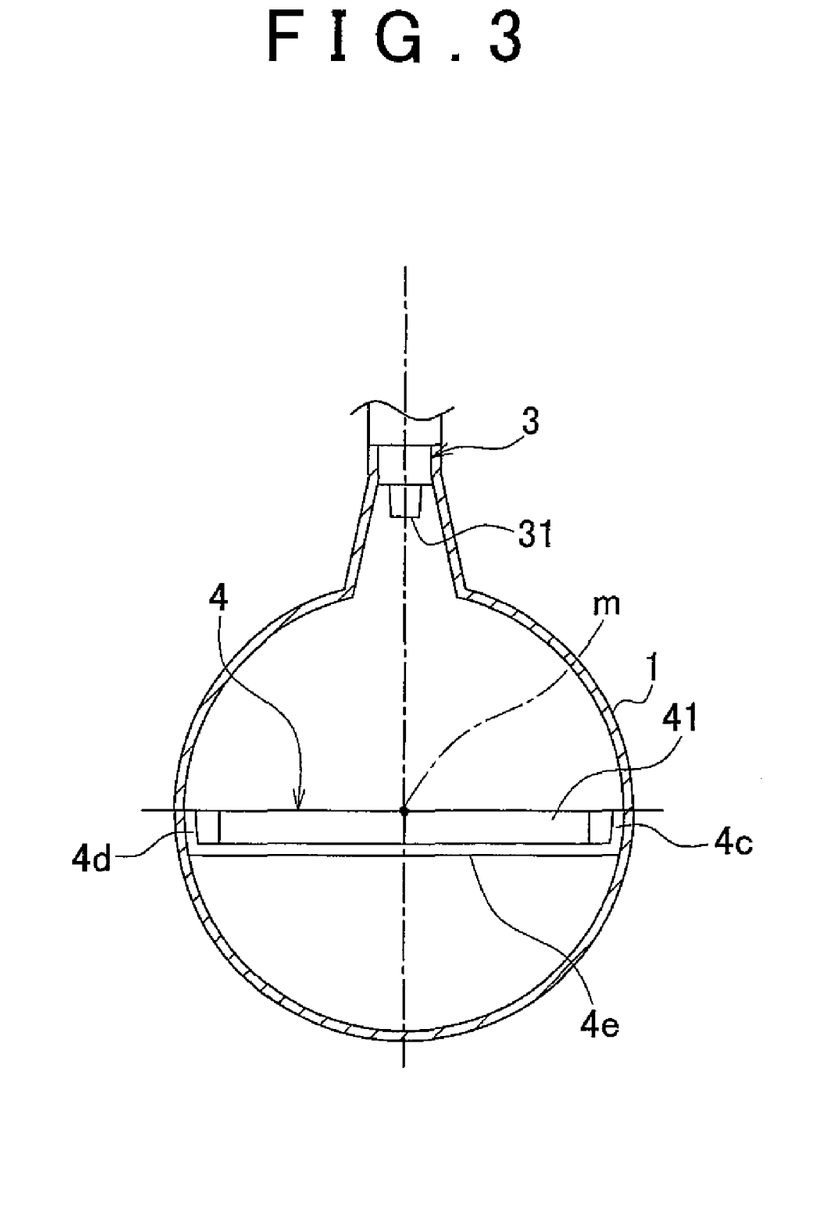
FIG. 3 is a sectional view of the exhaust passage taken at a position near an injection nozzle and the diffusion plate, the sectional view, seen from an upstream side in an exhaust-gas flow direction.

The diffusion plate 4 further includes a plurality of collision pieces (an example of the collision portion) 41, and a plurality of passage portions 42. Each collision piece 41 is raised with respect to the exhaust-gas flow direction to face the urea aqueous solution injected from the injection port 31 of the injection nozzle 3. The urea aqueous solution injected into the exhaust passage 1 collides with the collision pieces 41. Each passage portion 42 is open behind the corresponding collision piece 41 when the diffusion plate 4 is seen from the position of the injection port 31, and guides part of the urea aqueous solution that has collided with the corresponding collision portion 41, to an area on the side of a rear surface (lower surface in FIG. 1 and FIG. 2) of the diffusion plate 4. As shown in FIG. 3, the diffusion plate 4 has a width (a length in a lateral direction, i.e., a width in a direction substantially orthogonal to the exhaust-gas flow direction) that is substantially equal to an inner diameter of the exhaust passage 1. The right and left ends of the diffusion plate 4 are attached to an inner peripheral wall of the exhaust passage 1. Each collision piece 41 is formed by cutting and raising a portion of the bottom wall 4e of the diffusion plate 4. Each passage portion 42 is formed between the collision pieces 41 formed by cutting and raising portions of the bottom wall 4e in a manner such that the passage portion 42 opens downward. Each collision piece 41 is formed by cutting and raising a portion of the bottom wall 4e so that the collision piece 41 extends obliquely upward toward the downstream side in the exhaust-gas flow direction. In this case, when the diffusion plate 4 is seen from the position of the injection port 31, each passage portion 42 is hidden behind the corresponding collision piece 41. Thus, the urea aqueous solution injected from the injection port 31 does not pass straight through each passage portion 42 toward the area on the side of the rear surface of the diffusion plate 4.

Figure 4:
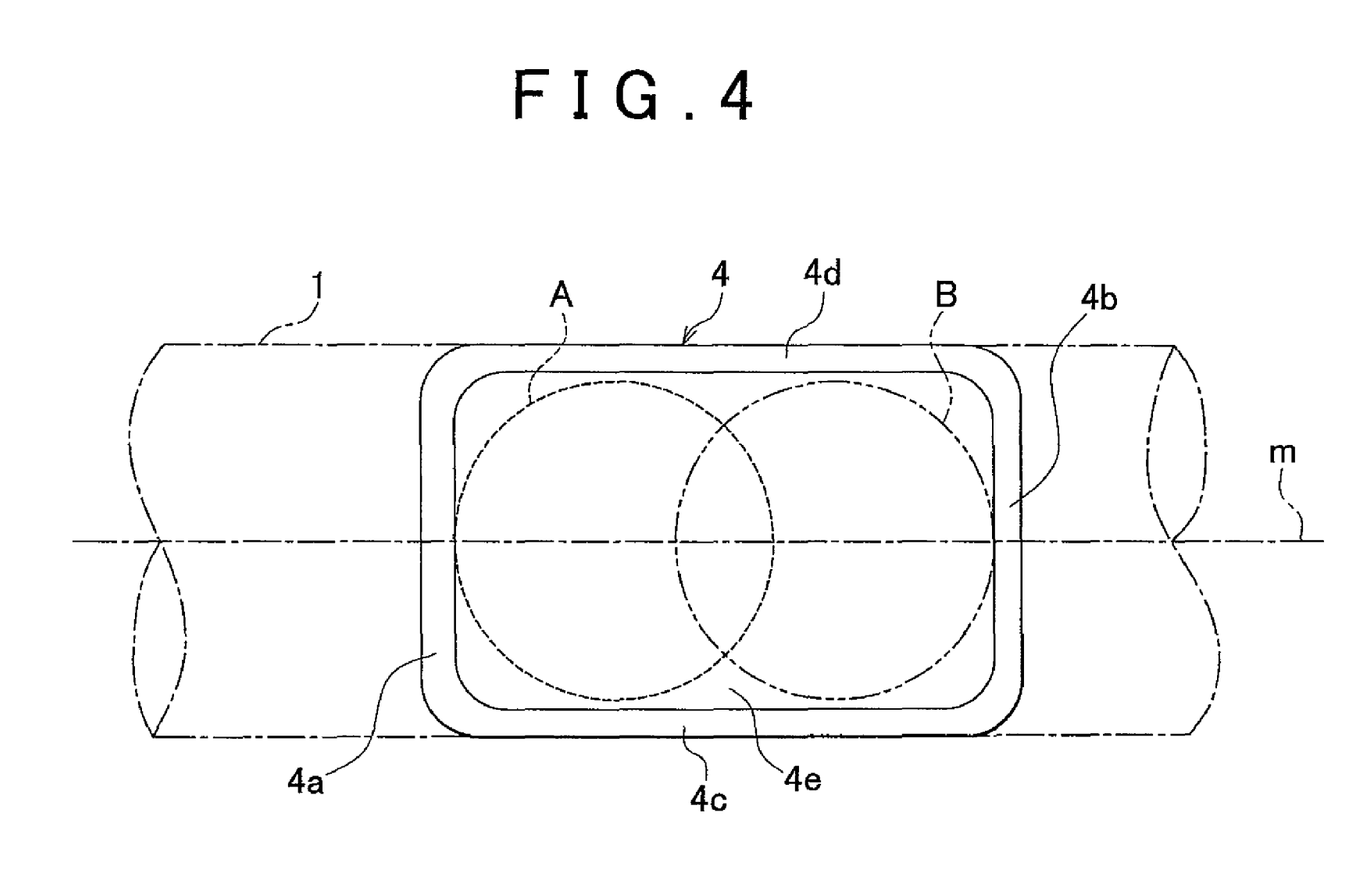
FIG. 4 is a plan view of the diffusion plate seen from above.

As shown in FIG. 4, the urea aqueous solution is injected from the injection port 31 of the injection nozzle 3 to an injection range A or an injection range B according to a flow speed of the exhaust gas, which changes according to an engine speed. The injection range A and the injection range B are located at different positions in the exhaust-gas flow direction. When the engine speed is low, the urea aqueous solution is injected to the injection range A (shown by a dashed line in FIG. 4). When the engine speed is high, the urea aqueous solution is injected to the injection range B (shown by a two-dot chain line in FIG. 4). The length of the diffusion plate 4 in the exhaust-gas flow direction is set so that the diffusion plate 4 is disposed to extend over the entire area of the different injection ranges A and B to which the additive agent is injected when the exhaust gas flows at respective different flow speeds. In this case, an end (upper end) of each collision piece 41 formed by cutting and raising a portion of the bottom wall 4e of the diffusion plate 4 is positioned at substantially the same height as the height at which ends (upper ends) of the upstream end wall 4a, the downstream end wall 4b, the left end wall 4c, and the right end wall 4d of the diffusion plate 4 are positioned. This minimizes the influence exerted on the flow of the exhaust gas by each collision piece 41 formed by cutting and raising a portion of the bottom wall 4e.

A reservoir portion 43 that retains part of the urea aqueous solution injected from the injection port 31 of the injection nozzle 3 is provided in the most upstream portion of the diffusion plate 4 in the exhaust-gas flow direction. The reservoir portion 43 is defined in the exhaust-gas flow direction by the upstream end wall 4a and the collision piece 41 at the most upstream position. The upstream end wall 4a functions as the raised portion that is raised from the bottom wall 4e to face the flow of the exhaust gas at a position upstream of the reservoir portion 43 in the exhaust-gas flow direction. The collision piece 41 at the most upstream position functions as the raised portion that is raised from the bottom wall 4e to face the flow of the exhaust gas at a position downstream of the reservoir portion 43 in the exhaust-gas flow direction. Side portions of the reservoir portion 43 are defined by upstream end portions of the left end wall 4c and the right end wall 4d.

Thus, in the above-described first embodiment, the diffusion plate 4 has a tray shape, and the diffusion plate 4 is disposed near the center portion of the exhaust passage 1 in the substantially horizontal state to extend in the exhaust-gas flow direction. Therefore, a flow passage area of the exhaust passage, through which the exhaust gas flows (i.e., a sectional area of the exhaust passage 1) is not greatly decreased by the diffusion plate 4. Accordingly, it is possible to sufficiently suppress an increase in a back pressure downstream of the diffusion plate 4 in the exhaust-gas flow direction. Also, because the diffusion plate 4 is disposed in the substantially horizontal state to extend in the exhaust-gas flow direction, the diffusion plate 4 has an extremely simple configuration. As a result, it is possible to provide the diffusion plate 4 at extremely low cost.

The urea aqueous solution is injected from the injection port 31 to cross the exhaust passage 1. The urea aqueous solution collides with the diffusion plate 4, and reliably collides with the collision pieces 41 that are raised with respect to the exhaust-gas flow direction, to face the injected urea aqueous solution. Therefore, the urea aqueous solution is atomized using energy generated due to the collision between the urea aqueous solution and the diffusion plate 4, that is, between the urea aqueous solution and each collision piece 41. Part of the urea aqueous solution that has collided with each collision piece 41 is guided to the area on the side of the rear surface of the diffusion plate 4, through the corresponding passage portion 42. Because each passage portion 42 is open behind the corresponding collision piece 41 when the diffusion plate 4 is seen from the position of the injection port 31, it is possible to avoid the situation where the urea aqueous solution injected into the exhaust gas passes straight through each passage portion 42 toward the area on the side of the rear surface of the diffusion plate 4, without colliding with the collision piece 41. Accordingly, it is possible to smoothly atomize the urea aqueous solution using the energy generated due to the collision between the urea aqueous solution and the diffusion plate 4, that is, between the urea aqueous solution and each collision piece 41. Thus, it is possible to efficiently diffuse the urea aqueous solution in the exhaust gas in the area on the side of the surface of the diffusion plate 4, and to diffuse the urea aqueous solution in the exhaust gas in the area on the side of the fear surface of the diffusion plate 4 via each passage portion 42. Thus, it is possible to further increase the performance of diffusing the urea aqueous solution.

Also, the diffusion plate 4 is disposed to extend over the entire area of the injection ranges A and B which are located at different positions in the exhaust-gas flow direction, and to which the urea aqueous, solution is injected when the exhaust gas flows at respective different flow speeds. Therefore, the diffusion plate 4 is positioned to extend over both of the injection ranges A and B. When the flow speed of the exhaust gas is low, the urea aqueous solution is injected to the injection range A that is positioned upstream of the injection range B to which the urea aqueous solution is injected when the flow speed of the exhaust gas is high. That is, when the flow speed of the exhaust gas is high, the urea aqueous solution is injected to the injection range B that is positioned downstream of the injection range A to which the urea aqueous solution is injected when the flow speed of the exhaust gas is low. Accordingly, the urea aqueous solution injected from the injection port 31 reliably collides with the diffusion plate 4, that is, each collision piece 41 so that the urea aqueous solution is atomized, regardless of the flow speed of the exhaust gas. Thus, it is possible to reliably diffuse the urea aqueous solution in the exhaust gas, and to further increase the performance of diffusing the urea aqueous solution.

Further, the reservoir portion 43, which retains part of the urea aqueous solution injected from the injection port 31 of the injection nozzle 3, is provided in the most upstream portion of the diffusion plate 4 in the exhaust-gas flow direction. The reservoir portion 43 is defined in the exhaust-gas flow direction by the upstream end wall 4a disposed upstream of the reservoir portion 43 in the exhaust-gas flow direction, and the collision piece 41 at the most upstream position, which is disposed downstream of the reservoir portion 43 in the exhaust-gas flow direction. The side portions of the reservoir portion 43 are defined by the upstream end portions of the left end wall 4c and the right end wall 4d. Thus, when the flow of the exhaust gas enters the reservoir portion 43, the exhaust gas is surrounded by the upstream end wall 4a, the collision piece 41 at the most upstream position, and the upstream end portions of the left end wall 4c and the right end wall 4d, and therefore, the flow speed of the exhaust gas is decreased. Accordingly, the urea aqueous solution retained in the reservoir portion 43 is evaporated and slowly drawn out from the reservoir portion 43 due to the exhaust gas whose flow speed is decreased. Thus, the urea aqueous solution is efficiently diffused in the exhaust gas.

Next, a second embodiment of the invention will be described with reference to FIG. 5.

In the second embodiment, the configuration of the diffusion plate is changed. The portions of the configuration other than the diffusion plate in the second embodiment is the same as the those in the first embodiment. Therefore, the same and corresponding portions as those in the first embodiment are denoted by the same reference numerals, and the detailed description thereof will be omitted.

Figure 5:
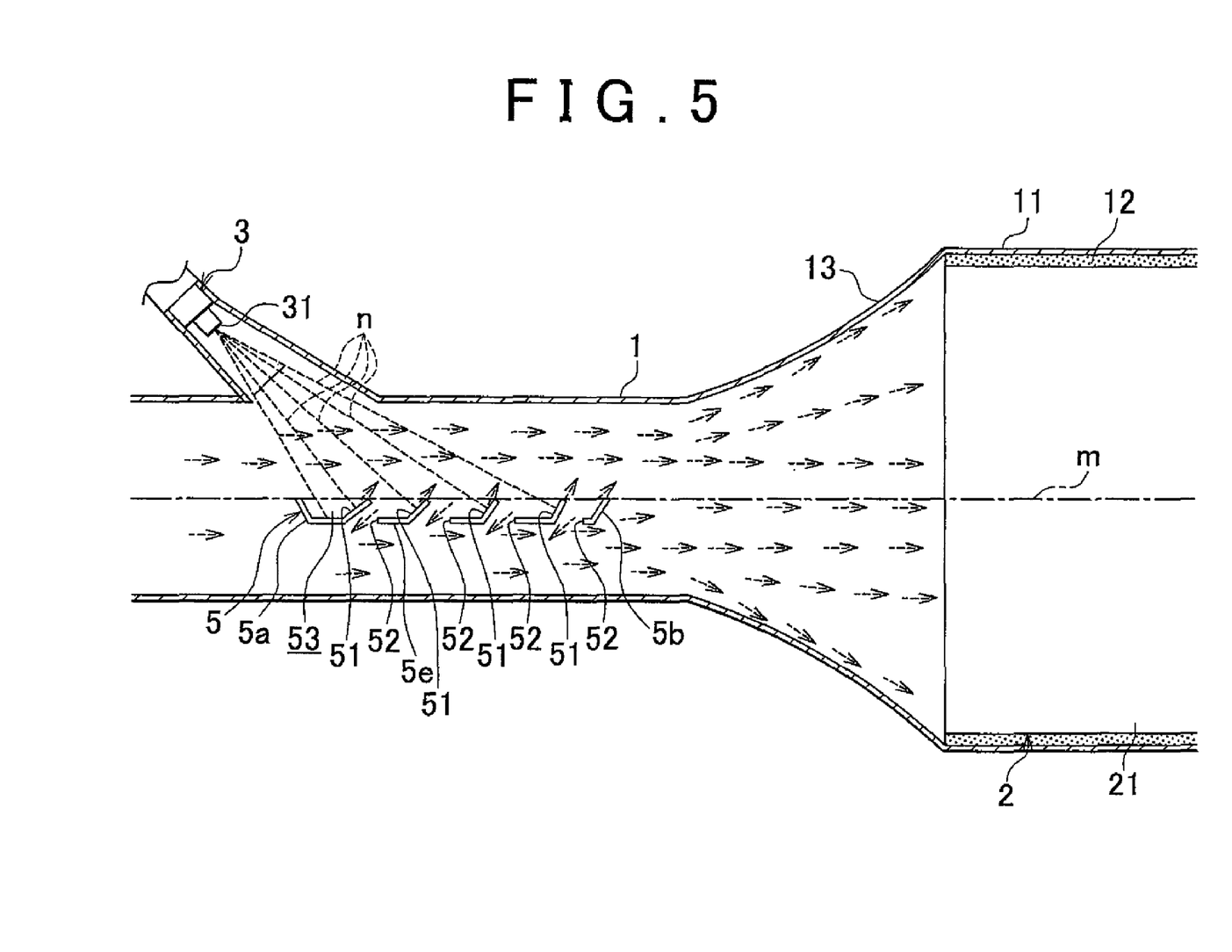
FIG. 5 is a sectional view of an area of the exhaust passage, where a diffusion plate according to a second embodiment of the invention is provided, the sectional view seen from the side.

That is, in the second embodiment, as shown in FIG. 5, a diffusion plate 5 includes an upstream end wall 5a, a downstream end wall 5b, a left end wall, and a right end wall. The upstream end wall 5a is formed by raising upward an upstream end of a bottom wall 5e. The downstream end wall 5b is formed by raising upward a downstream end of the bottom wall 5e. The left end wall 5c is formed by raising upward a left end of the bottom wall 5e. The right end wall 5d is formed by raising upward a right end of the bottom wall 5e. Thus, the diffusion plate 5 has a tray shape. The diffusion plate 5 further includes a plurality of collision pieces (collision portions) 51, and a plurality of passage portions 52. Each collision piece 51 is raised with respect to the exhaust-gas flow direction to face the urea aqueous solution injected from the injection port 31 of the injection nozzle 3. The urea aqueous solution injected into the exhaust passage 1 collides with the collision pieces 51. Each passage portion 52 is provided behind the corresponding collision piece 51 when the diffusion plate 5 is seen from the position of the injection port 31, and guides part of the urea aqueous solution that has collided with the corresponding collision portion 51, to an area on the side of a rear surface (lower surface in FIG. 5) of the diffusion plate 5. The diffusion plate 5 has a width (a length in the lateral direction, i.e., the direction substantially orthogonal to the exhaust-gas flow direction) that is substantially equal to the inner diameter of the exhaust passage 1. The fight and left ends of the diffusion plate 5 are attached to the inner peripheral wall of the exhaust passage 1. Each collision piece 51 is formed by cutting and raising a portion of the bottom wall 5e so that the collision piece 51 extends obliquely upward, toward the downstream side in the exhaust-gas flow direction. Each passage portion 52 is formed between the collision pieces 51 formed by cutting and raising portions of the bottom wall 5e in a manner such that the passage portion 52 opens downward. The collision pieces 51 of the diffusion plate 5 are inclined obliquely upward toward the downstream side in the exhaust-gas flow direction at different angles. The collision pieces 51 include surfaces that extend in directions orthogonal to respective injection axes n along which the urea aqueous solution is injected from the injection port 31 of the injection nozzle 3. In this case, when the diffusion plate 5 is seen from the position of the injection port 31, each passage portion 52 is hidden behind the corresponding collision piece 51. Thus, the urea aqueous solution injected from the injection port 31 does not pass straight through each passage portion 52 toward the area on the side of the rear surface of the diffusion plate 4.

A reservoir portion 53 that retains part of the urea aqueous solution injected from the injection port 31 of the injection nozzle 3 is provided in the most upstream portion of the diffusion plate 5 in the exhaust-gas flow direction. The reservoir portion 53 is defined in the exhaust gas flow direction by the upstream end wall 5a and the collision piece 51 at the most upstream position. The upstream end wall 5a functions as the raised portion that is raised from the bottom wall 5e to face the flow of the exhaust gas at a position upstream of the reservoir portion 53 in the exhaust-gas flow direction. The collision piece 51 at the most upstream position functions as the raised portion that is raised from the bottom wall 5e to face the flow of the exhaust gas at a position downstream of the reservoir portion 53 in the exhaust-gas flow direction. Side portions of the reservoir portion 53 are defined by upstream end portions of the left end wall and the right end wall.

Thus, in the second embodiment, the urea aqueous solution is injected from the injection port 31 to cross the exhaust passage 1. The urea aqueous solution collides with the diffusion plate 5, and reliably collides with the collision pieces 51 including the surfaces that extend in the directions orthogonal to the respective injection axes n along which the urea aqueous solution is injected. Therefore, the urea, aqueous solution is atomized using energy generated due to the collision between the urea aqueous solution and the diffusion plate 5, that is, between the aqueous solution and each collision piece 51. Part of the urea aqueous solution that has collided with each collision piece 51 is guided to the area on the side of the rear surface of the diffusion plate 5 through the corresponding passage portion 52. Because each passage portion 52 is open behind the corresponding collision piece 51 when the diffusion plate 5 is seen from the position of the injection port 31, it is possible to avoid the situation where the urea aqueous solution injected into the exhaust gas passes straight through each passage portion 52 toward the area on the side of the rear surface of the diffusion plate 5, without colliding with the collision piece 51. As a result, the urea aqueous solution is atomized into finer particles using the energy generated due to the collision between the urea aqueous solution and the diffusion plate 5, that is, between the urea aqueous solution and each collision piece 51. Accordingly, it is possible to efficiently diffuse the urea aqueous solution in the exhaust gas in the area on the side of the surface of the diffusion plate 5, and to diffuse the urea aqueous solution in the exhaust gas in the area on the side of the rear surface of the diffusion plate 5 via each passage portion 52. Thus, it is possible to further increase the performance of diffusing the urea aqueous solution.

Next, a third embodiment of the invention will be described with reference to FIG. 6 and FIG. 7.

In the third embodiment, the configuration of the injection nozzle and the configuration of the diffusion plate are changed. The portions of the configuration other than the injection nozzle and the diffusion plate in the third embodiment are the same as those in the first embodiment. Therefore, the same and corresponding portions as those in the first embodiment are denoted by the same reference numerals, and the detailed description thereof will be omitted.

Figure 6:
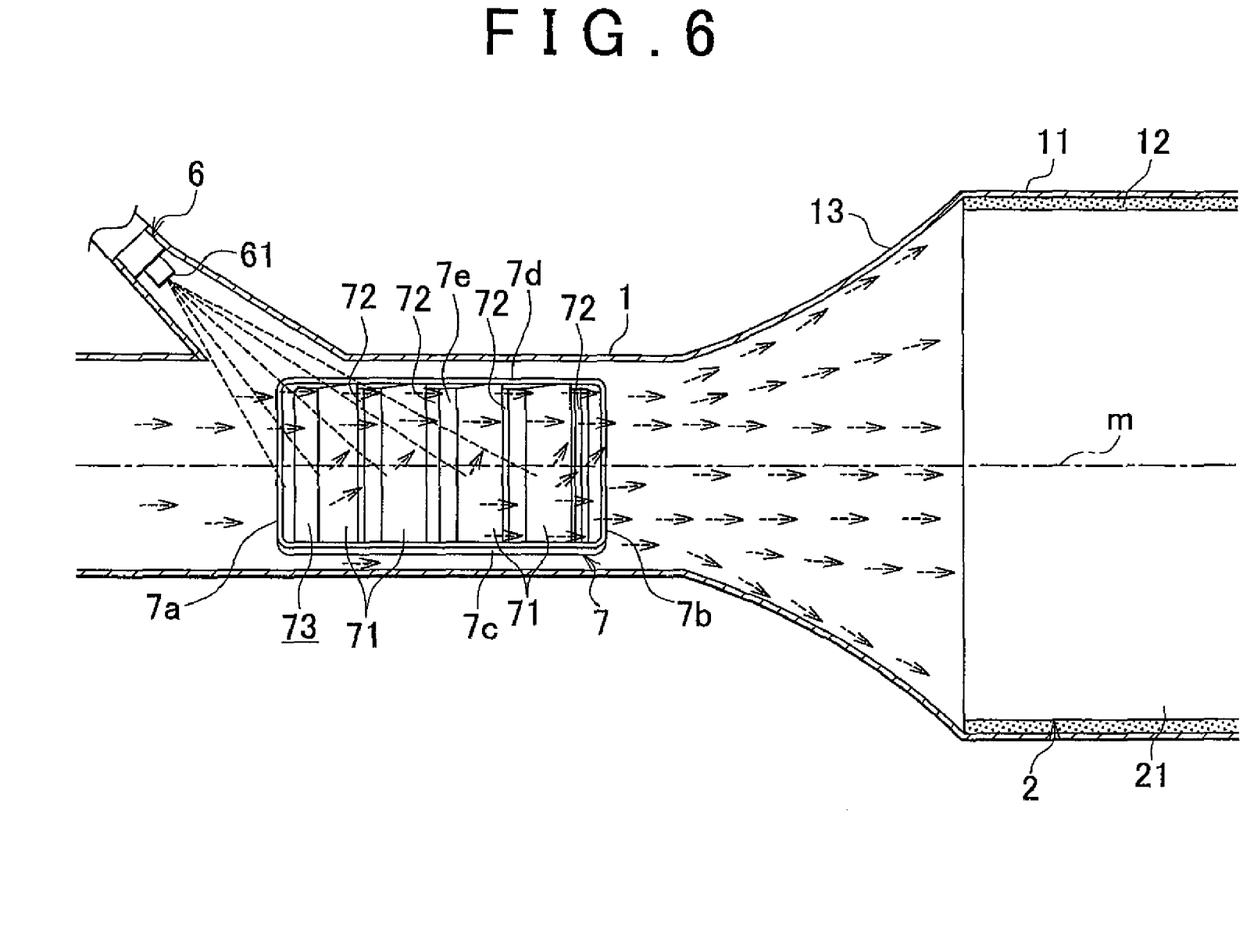
FIG. 6 is a sectional view of an area of the exhaust passage, where a diffusion plate according to a third embodiment of the invention is provided, the sectional view seen from above.
Figure 7:
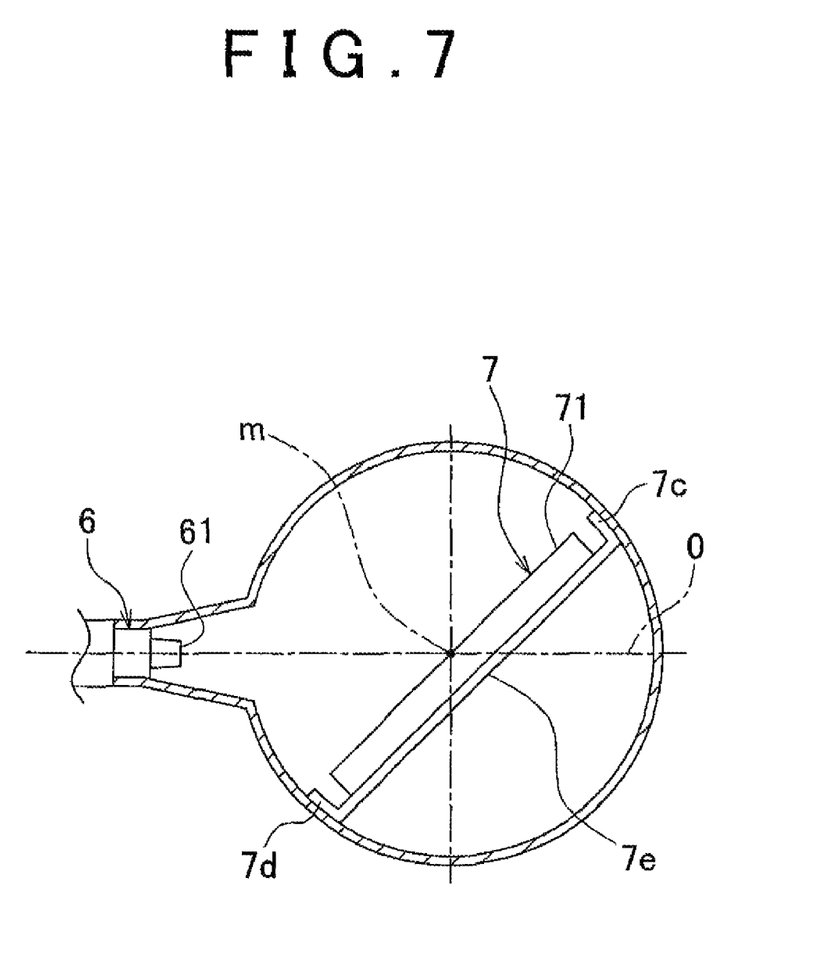
FIG. 7 is a sectional view of the exhaust passage taken at a position near the injection nozzle and the diffusion plate, the sectional view seen from the upstream side in the exhaust-gas flow direction.

That is, in the third embodiment, as shown in FIG. 6 and FIG. 7, an injection port 61 of an injection nozzle 6 is provided on the peripheral wall of the exhaust passage 1 at a side position, that is, on a horizontal line o (shown in FIG. 7) orthogonal to the axis m of the exhaust passage 1.

Also, the diffusion plate 7 is inclined toward the injection port 61 (for example, at approximately 45 degrees) with respect to a horizontal surface on the horizontal line o so that the urea aqueous solution injected from the injection port 61 of the injection nozzle 6 collides with a large area of the diffusion plate 7. The diffusion plate 7 includes an upstream end wall 7a, a downstream end wall 7b, a left end wall 7c, and a right end wall 7d. The upstream end wall 7a is formed by raising obliquely upward an upstream end of a bottom wall 7e. The downstream end wall 7b is formed by raising obliquely upward a downstream end of the bottom wall 7e. The left end wall 7c is formed by raising obliquely upward a left end of the bottom wall 7e. The right end wall 7d is formed by raising obliquely upward a right end of the bottom wall 7e. Thus, the diffusion plate 7 has a tray shape. The diffusion plate 7 further includes a plurality of collision pieces (collision portions) 71, and a plurality of passage portions. Each collision piece 71 is raised with respect to the exhaust-gas flow direction to face the urea aqueous solution injected from the injection port 61 of the injection nozzle 6. The urea aqueous solution injected into the exhaust passage 1 collides with the collision pieces 71. Each passage portion 72 is provided behind the corresponding collision piece 71 when the diffusion plate 7 is seen from the position of the injection port 61, and guides part of the urea aqueous solution that has collided with the corresponding collision portion 71, to an area on the side of a rear surface (toward a deep area in FIG. 6) of the diffusion plate 7. The diffusion plate 7 has a width (a length in the lateral direction, i.e., the direction substantially orthogonal to the exhaust-gas flow direction) that is substantially equal to the inner diameter of the exhaust passage 1. The right and left ends of the diffusion plate 7 are attached to the inner peripheral wall of the exhaust passage 1. Each collision piece 71 is formed by cutting and raising a portion of the bottom wall 7e so that the collision piece 71 extends obliquely upward toward the downstream side in the exhaust-gas flow direction. Each passage portion 72 is formed between the collision pieces 71 formed by cutting and raising portions of the bottom wall 7e in a manner such that the passage portion 72 opens downward. Each collision piece 71 is formed by cutting and raising a portion of the bottom wall 7e obliquely upward toward the downstream side in the exhaust-gas flow direction. In this case, when the diffusion plate 7 is seen from the position of the injection port 61, each passage portion 72 is hidden behind the corresponding collision piece 71. Thus, it is possible to avoid the situation where the urea aqueous solution injected from the injection port 61 passes straight through each passage portion 72 toward the area on the side of the rear surface of the diffusion plate 7, without colliding with the collision piece 71.

A reservoir portion 73 that retains part of the urea aqueous solution injected from the injection port 61 of the injection nozzle 6 is provided in the most upstream portion of the diffusion plate 7 in the exhaust-gas flow direction. The reservoir portion 73 is defined in the exhaust-gas flow direction by the upstream end wall 7a and the collision piece 71 at the most upstream position. The upstream end wall 7a functions as the raised portion that is raised from the bottom wall 7e to face the flow of the exhaust gas at a position upstream of the reservoir portion 73 in the exhaust-gas flow direction. The collision piece 71 at the most upstream position functions as the raised portion that is raised from the bottom wall 7e to face the flow of the exhaust gas at a position downstream of the reservoir portion 73 in the exhaust-gas flow direction. Side portions of the reservoir portion 73 are defined by upstream end portions of the left end wall 7c and the right end wall 7d.

Thus, in the third embodiment, the urea aqueous solution is injected from the injection port 61 to cross the exhaust passage 1. The urea aqueous solution collides with a large area of the diffusion plate 7 that is inclined toward the injection port 61 with respect to the horizontal surface on the horizontal line o. In addition, the urea aqueous solution reliably collides with each collision piece 71 that is raised with respect to the exhaust-gas flow direction to face the injected urea aqueous solution. Therefore, the urea aqueous solution is atomized using the energy generated due to the collision between the urea aqueous solution and, the diffusion plate 7, that is, between the urea aqueous solution and each collision piece 71. Part of the urea aqueous solution that has collided with each collision piece 71 is guided to the area on the side of the rear surface of the diffusion plate 7 through the corresponding passage portion 72. Because each passage portion 72 is open behind the corresponding collision piece 71 when the diffusion plate 7 is seen from the position of the injection port 61, it is possible to avoid the situation where the urea aqueous solution injected into the exhaust passage 1 passes straight through each passage portion 72 toward the area on the side of the rear surface of the diffusion plate 7, without colliding with the collision piece 71. As a result, the urea aqueous solution is atomized into finer particles using the energy generated due to the collision between the urea aqueous solution and the diffusion plate 7, that is, between the urea aqueous solution and each collision piece 71. Accordingly, it is possible to efficiently diffuse the urea aqueous solution in the exhaust gas in the area on the side of the surface of the diffusion plate 7, and to diffuse the urea aqueous solution in the exhaust gas in the area on the side of the rear surface of the diffusion plate 7 via each passage portion 72. Thus, it is possible to further increase the performance of diffusing the urea aqueous solution.

Further, because the injection port 61 of the injection nozzle 6 is provided on the peripheral wall portion of the exhaust passage 1 at the side position, a supply pipe for supplying the urea aqueous solution to the injection port 61 at the side position on the peripheral wall portion of the exhaust passage 1 is smoothly cooled by air flowing along an outside of the peripheral wall portion of the exhaust passage 1 when a vehicle travels. Therefore, the supply pipe for supplying the urea aqueous solution to the injection port 61 does not need to be protected with a heat-resistant material such as an insulator, unlike the case where the injection port is provided on the peripheral wall portion of the exhaust passage at the upper position, and the supply pipe needs to be protected with a heat-resistant material due to heat retained in an upper area of the exhaust passage. Thus, a heat-resistant material for protecting the supply pipe is riot required, and therefore, the cost is reduced.

Next, a fourth embodiment of the invention will be described with reference to FIG. 8 and FIG. 9.

In the fourth embodiment, the configuration of the collision pieces of the diffusion plate is changed. The portions of the configuration other than the collision pieces of the diffusion plate in the fourth embodiment are the same as those in the first embodiment. Therefore, the same and corresponding portions as those in the first embodiment are denoted by the same reference numerals, and the detailed description thereof will be omitted.

Figure 8:
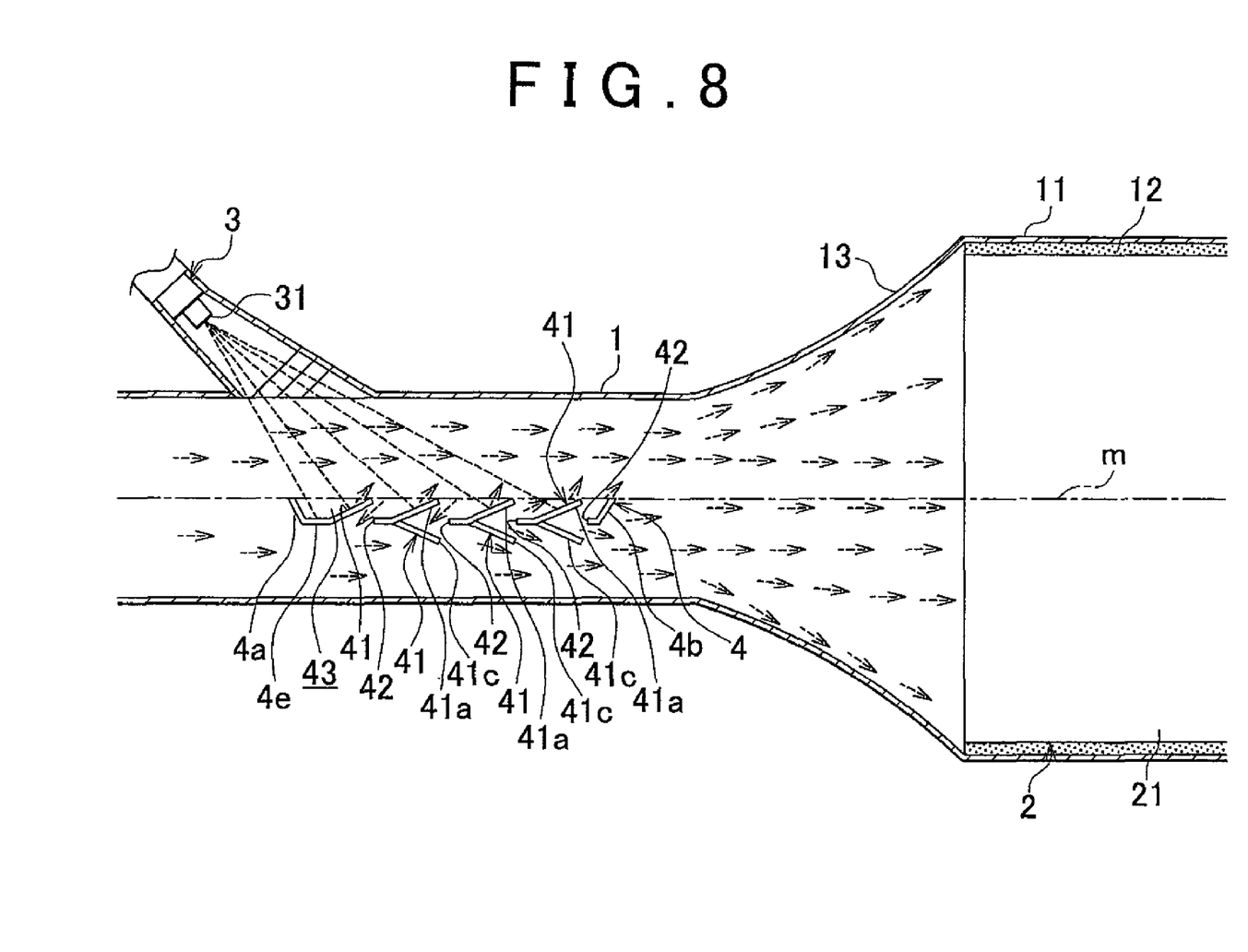
FIG. 8 is a sectional view of an area of the exhaust passage, where a diffusion plate according to a fourth embodiment of the invention is provided, the sectional view seen from the side.
Figure 9:
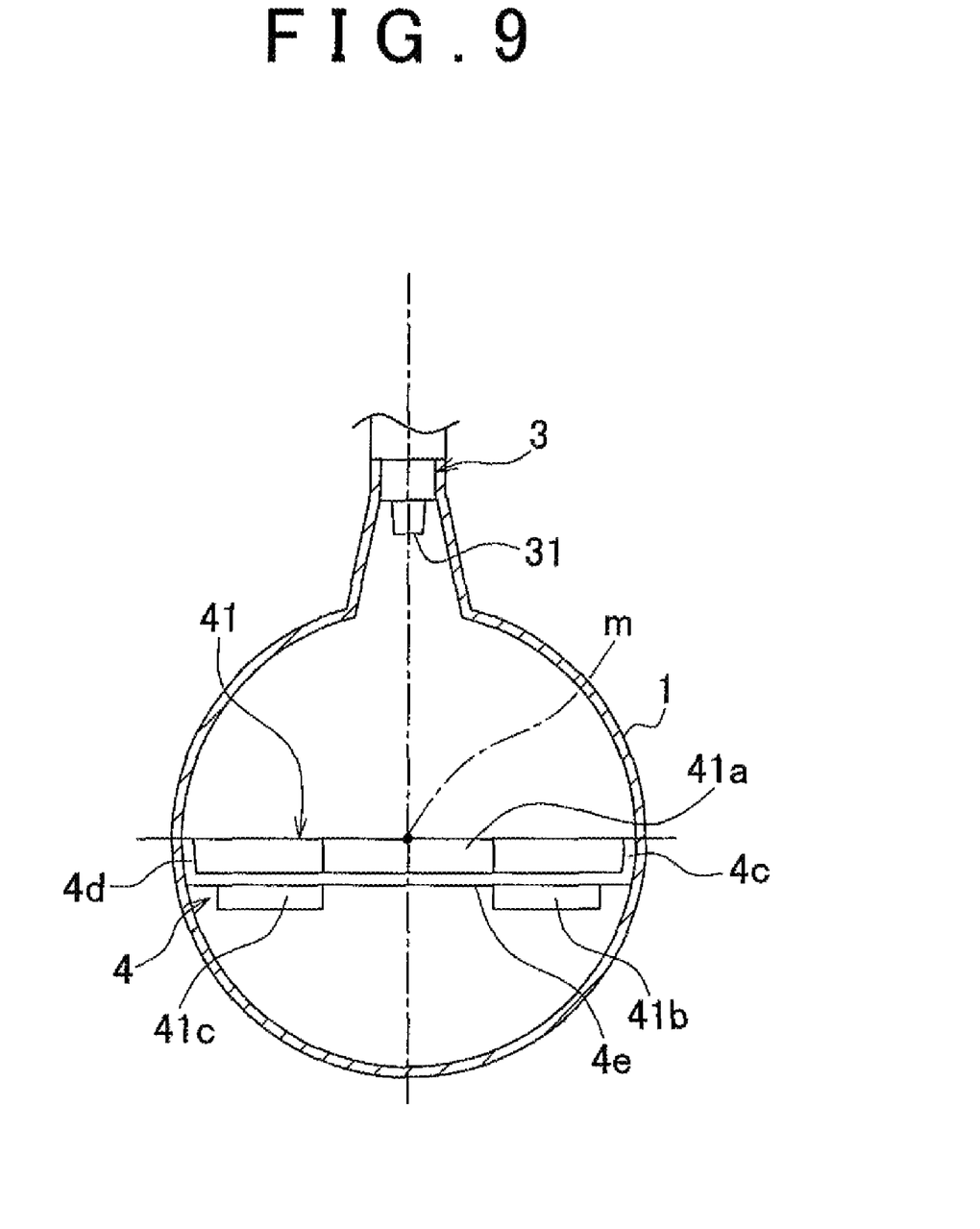
FIG. 9 is a sectional view of the exhaust passage taken at a position near the injection nozzle and the diffusion plate, the sectional view seen from the upstream side in the exhaust-gas flow direction.

That is, in the fourth embodiment, as shown in FIG. 8 and FIG. 9, in each of the collision pieces 41 excluding the collision, piece 41 at the most upstream position, a center portion 41a at a substantially center position in the lateral direction (i.e., the direction substantially orthogonal to the exhaust-gas flow direction) thereof is separated from side portions 41b and 41c in the lateral direction (as shown in FIG. 9). In this case, the area, to which the urea aqueous solution is injected from the injection port 31, is limited to the collision piece 41 at the most upstream position, and the center portions 41a of the collision pieces 41 excluding the collision piece 41 at the most upstream position.

The center portion 41a of each of the collision pieces 41 excluding the collision piece 41 at the most upstream position is formed by cutting and raising a portion of the bottom wall 4e so that the center portion 41a extends obliquely upward toward the downstream side in the exhaust-gas flow direction. The side portions 41b and 41c of each of the collision pieces 41 excluding the collision piece 41 at the most upstream position are formed by cutting and depressing portions of the bottom wall 4e so that the side portions 41b and 41c extend obliquely downward toward the downstream side in the exhaust-gas flow direction.

Thus, in the fourth embodiment, the urea aqueous solution injected from the injection port 31 of the injection nozzle 3 collides with the collision piece 41 at the most upstream position, and the center portions 41a of the collision pieces 41 excluding the collision piece 41 at the most upstream position, and thus, the urea aqueous solution is atomized into fine particles. Part of the atomized urea aqueous solution is guided to the area on the side of the rear surface of the diffusion plate 4. That is, it is possible to avoid the situation where the urea aqueous solution passes straight through each passage portion 42 toward the area on the side of the rear surface of the diffusion plate 4. Accordingly, it is possible to efficiently diffuse the urea aqueous solution in the exhaust gas in the area on the side of the surface of the diffusion plate 4, and to diffuse the urea aqueous solution in the exhaust gas in the area on the side of the rear surface of the diffusion plate 4 via each passage portion 72. Thus, it is possible to further increase the performance of diffusing the urea aqueous solution.

Further, the side portions 41b and 41c of each of the collision pieces 41 excluding the collision piece 41 at the most upstream position are formed by cutting and depressing portions of the bottom walls 4e obliquely downward. Therefore, the part of the atomized urea aqueous solution guided to the area on the side of the rear surface of the diffusion plate 4 is smoothly guided to the area on the side of the rear surface of the diffusion plate 4 by the side portions 41b and 41c. Thus, it is possible to efficiently increase the performance of diffusing the urea aqueous solution in the area on the side of the rear surface of the diffusion plate 4.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention. For example, in each of the above-described embodiments, the urea aqueous solution injected from the injection port 31 or 61 of the injection nozzle 3 or 6 into the exhaust gas collides with the diffusion plate 4, 5, or 7 at a position upstream of the exhaust gas purification device 2 including the selective reduction catalyst 21. However, an exhaust gas purification device including a zeolitic catalyst may be provided in the exhaust passage, and the fuel component (HC component) injected from the injection port of the injection nozzle into the exhaust gas may collide with the diffusion plate at a position upstream of the exhaust gas purification device.

Also, in each of the above-described embodiments, each of the collision pieces 41, 51, or 71 is raised with respect to the exhaust-gas flow direction to face the urea aqueous solution injected from the injection port 31 of 61 of the injection nozzle 3 or 6. However, the bottom wall of the diffusion plate may have a stepped shape, that is, the bottom wall may include an upper flat surface portion that extends in the exhaust-gas flow direction, and a lower flat surface portion that is disposed downstream of the upper flat surface portion, and that extends in the exhaust-gas flow direction a collision portion may be provided at the upper flat surface portion; and a passage portion may be provided between a downstream end of the upper flat surface portion (collision portion) in the exhaust-gas flow direction, and an upstream end of the lower flat surface portion in the exhaust-gas flow direction. The number of the collision portions is not limited to a specific number, and the number of passage portions is not limited to a specific number. That is, when the diffusion plate includes a plurality of flat surface portions disposed at a plurality of levels, the collision portion may be provided at a flat surface portion at each level, and a passage portion may be provided between a downstream end of one of each pair of flat surface portions adjacent to each other in a vertical direction, and an upstream end of the other of the pair of the flat surface portions.

Also, in the fourth embodiment, the center portion 41*a* of each of the collision pieces 41 excluding the collision piece 41 at the most upstream position is formed by cutting and raising a portion of the bottom wall 4*e* obliquely upward. The side portions 41*b* and 41*c* of each of the collision pieces 41 excluding the collision piece 41 at the most upstream position are formed by cutting and depressing portions of the bottom wall 4*e* obliquely downward. However, the center portion of each collision piece may be formed by cutting and depressing a portion of the bottom wall obliquely downward, and the side portions of each collision piece may be formed by cutting and raising portions of the bottom wall obliquely upward. Alternatively, only a selected collision piece may be divided into portions in the lateral direction (i.e., the direction substantially orthogonal to the exhaust-gas flow direction), and each portion of the selected collision piece may be appropriately formed by cutting and raising a portion of the bottom wall obliquely upward, or by cutting and depressing a portion of the bottom wall obliquely downward, according to the characteristics of the flow of the exhaust gas in the exhaust passage. In this case, the area, to which the urea aqueous solution is injected from the injection port, needs to be limited to a portion of each collision piece, which is formed by cutting and raising a portion of the bottom wall obliquely upward, and each passage portion needs to be hidden behind the portion of the collision piece, which is formed by cutting and raising a portion of the bottom wall obliquely upward, when the diffusion plate is seen from the injection port.

Further, in the above-described embodiment, the additive-agent diffusion plate structure is applied to the exhaust passage for a diesel engine. However, the additive-agent diffusion plate structure may be applied to an exhaust passage for a direct injection gasoline engine from which NOx may be discharged together with the exhaust gas depending on an operating condition.

What is claimed is:

1. An additive-agent diffusion plate in an exhaust passage for an engine, comprising:
    a bottom wall disposed to extend in an exhaust-gas flow direction in which exhaust gas flows in the exhaust passage;
    a collision portion with which an additive agent injected into the exhaust passage to cross the exhaust passage collides; and
    a passage portion which is formed in the bottom wall, and that has an open portion which opens behind the collision portion when the additive-agent diffusion plate is seen from a position from which the additive agent is injected;
    wherein the collision portion extends upwardly from the bottom wall to face the injected additive agent, and
    the bottom wall is planar;
    wherein the collision portion is formed by bending a portion of the bottom wall.

2. The additive-agent diffusion plate according to claim 1, wherein:
    an injection range, to which the additive agent is injected from the injection port, shifts in the exhaust-gas flow direction, according to a flow speed of the exhaust gas; and
    the additive-agent diffusion plate is disposed to extend over an entire area of the injection range that shifts according to the flow speed of the exhaust gas.

3. The additive-agent diffusion plate according to claim 1, further comprising
    a reservoir portion that retains part of the additive agent injected into the exhaust passage, wherein the reservoir portion is defined in the exhaust-gas flow direction by raised portions that are raised from the bottom wall to face a flow of the exhaust gas at positions upstream and downstream of the reservoir portion in the exhaust-gas flow direction.

4. The additive-agent diffusion plate according to claim 1, wherein the collision portion includes a surface that extends in a direction orthogonal to an injection axis along which the additive agent is injected.

5. An additive-agent diffusion plate structure in an exhaust passage for an engine, comprising:
    an injection port that injects an additive agent, and that is disposed so that the injected additive agent crosses the exhaust passage; and
    an additive-agent diffusion plate that diffuses the additive agent injected from the injection port into the exhaust passage, at a position upstream of an exhaust gas purification device disposed in the exhaust passage,
    wherein
    the additive-agent diffusion plate comprises:
    a bottom wall that is disposed to extend in an exhaust-gas flow direction in which exhaust gas flows;
    a collision portion with which the additive agent injected into the exhaust passage collides; and
    a passage portion which is formed in the bottom wall, and that has an open portion which opens behind the collision portion, when the additive-agent diffusion plate is seen from a position of the injection port;

wherein the collision portion is raised from the bottom wall to face the injected additive agent, and the bottom wall is planar;

wherein the collision portion is formed by bending a portion of the bottom wall toward the injection port.

6. The additive-agent diffusion plate structure according to claim 5 wherein:

the collision portion includes a center portion disposed near a center in a length of the bottom wall in a direction orthogonal to the exhaust-gas flow direction, and side portions disposed on sides of the center portion in the direction orthogonal to the exhaust-gas flow direction; and the center portion is formed by bending a portion of the bottom wall toward the injection port, and the side portions are formed by bending portions of the bottom wall toward a side opposite to the injection port.

7. The additive-agent diffusion plate structure according to claim 5, wherein:

an injection range, to which the additive agent is injected from the injection port, shifts in the exhaust-gas flow direction, according to a flow speed of the exhaust gas; and the additive-agent diffusion plate is disposed to extend over an entire area of the injection range that shifts according to the flow speed of the exhaust gas.

8. The additive-agent diffusion plate structure according to claim 5, wherein:

the additive-agent diffusion plate includes a reservoir portion that retains part of the additive agent injected from the injection port; and the reservoir portion is defined in the exhaust-gas flow direction by raised portions that are raised from the bottom wall to face a flow of the exhaust gas at positions upstream and downstream of the reservoir portion in the exhaust-gas flow direction.

9. The additive-agent diffusion plate structure according to claim 5, wherein the collision portion includes a surface that extends in a direction orthogonal to an injection axis along which the additive agent is injected.

10. The additive-agent diffusion plate structure according to claim 9, wherein:

the collision portion comprises a plurality of collision portions;

the injection axis comprises a plurality of injection axes; and the plurality of collision portions have surfaces that extend in directions orthogonal to the respective axes of injection.

11. The additive-agent diffusion plate structure according to claim 5, wherein:

the injection port is provided on a peripheral wall portion of the exhaust passage at a side position; and the additive-agent diffusion plate is inclined toward the injection port with respect to a horizontal surface.

12. The additive-agent diffusion plate structure according to claim 5, wherein a plurality of collision portions are arranged in the exhaust-gas flow direction.

13. The additive-agent diffusion plate structure according to claim 5, wherein:

a cross section of the exhaust passage is circular; and a length of the bottom wall of the additive-agent diffusion plate in a direction orthogonal to the exhaust-gas flow direction is equal to an inner diameter of the exhaust passage.

14. The additive-agent diffusion plate structure according to claim 5, wherein:

the bottom wall has a stepped shape, and includes an upper flat surface portion extending in the exhaust-gas flow direction and a lower flat surface portion that extends in the exhaust-gas flow direction and is disposed downstream of the upper flat surface portion in the exhaust-gas flow direction;

the collision portion is provided in the upper flat surface portion; and the passage portion is provided between a downstream end of the collision portion provided in the upper flat surface portion in the exhaust-gas flow direction, and an upstream end of the lower flat surface portion in the exhaust-gas flow direction.

* * * * *